Nov. 14, 1961 J. H. GRIFFIN Re. 25,080

BUILT IN INSECTICIDE DISTRIBUTION SYSTEM

Original Filed June 23, 1958 2 Sheets-Sheet 1

INVENTOR,
JAMES H. GRIFFIN
BY Weatherford & Weatherford
attys

BUILT IN INSECTICIDE DISTRIBUTION SYSTEM

Original Filed June 23, 1958 2 Sheets-Sheet 2

INVENTOR,
JAMES H. GRIFFIN
BY Weatherford & Weatherford
Attys

United States Patent Office

Re. 25,080
Reissued Nov. 14, 1961

25,080

BUILT IN INSECTICIDE DISTRIBUTION SYSTEM

James H. Griffin, 3587 Charleswood Ave., Memphis, Tenn.

Original No. 2,915,848, dated Dec. 8, 1959, Ser. No. 743,776, June 23, 1958. Application for reissue Feb. 4, 1960, Ser. No. 6,827
9 Claims. (Cl. 43—124)

Matter enclosed in heavy brackets [ ] appears in the original patent but forms no part of this reissue specification; matter printed in italics indicates the additions made by reissue.

This invention relates to certain new and useful improvements in systems for the introduction of insecticides, particularly into dwellings and other structures, and more particularly relates to such systems which are adapted for the receipt and distribution of specially adapted insecticides for the purpose of ridding such houses or buildings of termites and other insect or pest life.

Many attempts have heretofore been made with respect to providing houses and other similar buildings with means for the distribution of insecticides, and particularly termiticides. Such prior attempts have largely been undertaken in connection with established buildings and have been relatively ineffectual in providing a widely expanding distribution system, particularly of the type which is contemplated in the present invention. Other devices have made an attempt to extend the distribution which may be accomplished by various termite repellant and killing substances, but the same have been substantially ineffectual because of the lack of stability of their installation.

The present invention contemplates a system which is particularly adapted for utilization with modern constructions in which houses are built comprising a foundation with a gravel fill and a concrete slab poured over the foundation and gravel fill for the purpose of providing the base for the entire house structure. The present invention further contemplates that during the construction of such a dwelling or house, pipe system means of the type contemplated in the present invention may be installed and locked into position through the utilization of the elements of the house structure.

This system may also be installed in conventional of "crawl" space types of construction in which means other than poured concrete slabs rest upon the foundation.

The principal object of the present invention is to provide, in building structures, a new and novel pipe system means for the distribution of insecticides, and other means for the killing of termites and other pests or insects.

A further object of the invention is to provide in such a system means which are permanently installed during the initial construction of the building, and which are tightly locked in position by the interaction of elements of the construction of such building.

A further object of the invention is to provide in such a system a pipe structure which is positioned to overlie the foundation portions of the structure, and which includes discharge means positioned to communicate with voids between an external veneer and the foundation, with voids within the foundation, and with gravel fill and other situations internally of the foundation.

A further object of the invention is to provide in such a system, means for the introduction of termite or pest killing insecticide or the like into adjacency with pipes projecting downwardly through the said structure into the sub-strata.

A further object of the invention is generally to improve the design, construction and efficiency of systems for the introduction of termite or pest control insecticides into various parts of building structures.

The means by which the foregoing and other objects of the present invention are accomplished and the manner of their accomplishment will be readily understood from the following specification upon reference to the accompanying drawings, in which.

Figure 1:
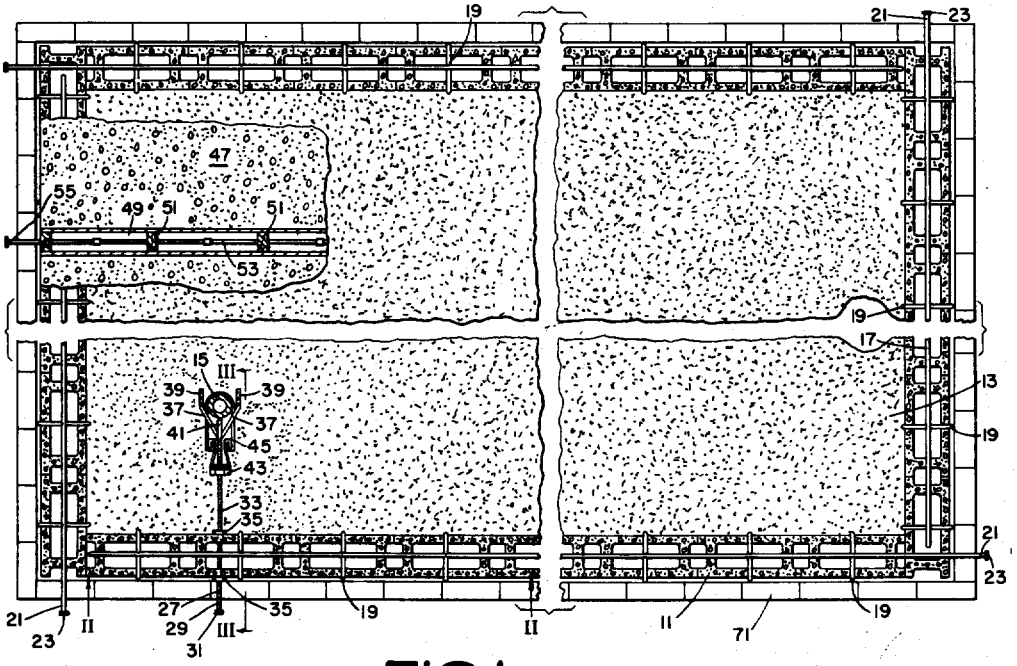
FIG. 1 is a somewhat fragmentary top plan view of a typical installation, showing the foundation and the gravel fill with representative pipes of a typical system in position, but with other elements of the building structure broken away for illustration.
Figure 2:
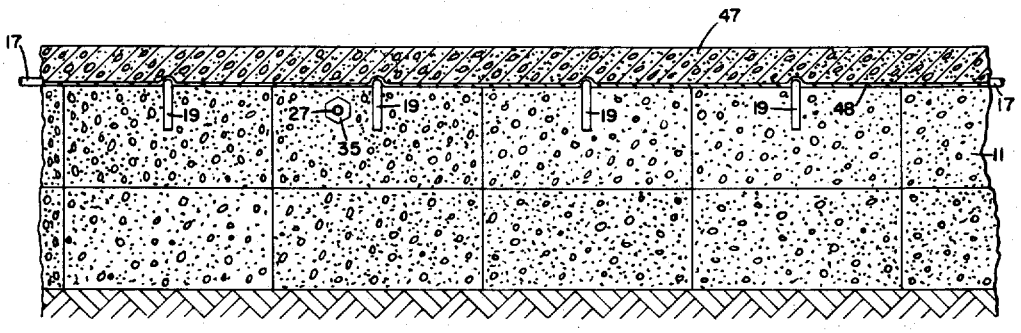
FIG. 2 is a fragmentary sectional view taken as on the line II—II of FIG. 1 on a somewhat enlarged scale, and also as on the line II—II of FIG. 3.
Figure 3:
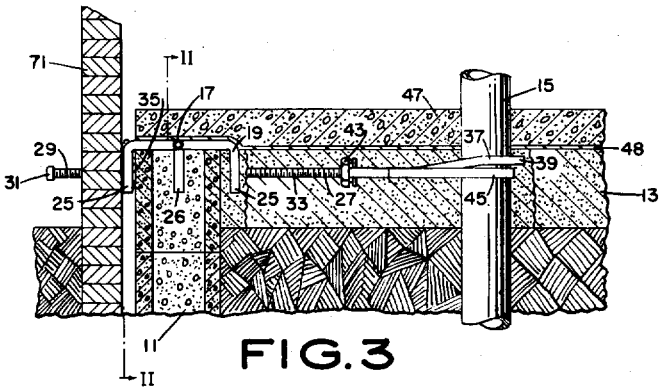
FIG. 3 is a fragmentary cross sectional view taken as on the line III—III of FIG. 1, with parts broken away for purposes of illustration.

Referring now to the drawings in which the various parts are indicated by numerals, a typical building or house construction is illustrated in several steps and phases. In the construction, as illustrated in the present drawings, a foundation 11 is formed preferably from hollow concrete blocks of substantially conventional type and extends around the periphery of the structure to be undertaken. In the present drawings, particularly FIG. 1, foundation 11 is illustrated as being of substantially rectangular plan, although it will be understood that other formations and shapes of foundations may be employed with the present invention. Within the confines of foundation 11 the building structure is preferably provided with a fill 13, as of gravel or other form of aggregate, which in final position extend from wall to wall and side to side of the foundation, and which preferably in the final and completed form of the building is filled substantially to the level of the upper extremity of foundation 11.

Within the building structure are usually one or more pipes which are adapted to extend upwardly into the interior of the building to be mounted as upon a foundation 11, and which extend downwardly through the supporting structures and into the earth therebeneath. These pipes may include soil pipes such as the soil pipe 15, and other piping such as plumbing pipes and other desirable pipings for a residential or other structure.

Preferably in the construction of housing as of the type here under consideration, foundation 11 is mounted with the lower part of foundation 11 being extended horizontally along a trench of suitable dimensions cut into and beneath the surface of the earth. Piping, such as soil pipe 15 and other piping, is mounted in position and thereafter the foundation and mounted pipes are ready for the reception of the gravel of fill 13.

Prior to the application of waterproofing and pouring of a concrete slab as hereafter described the discharge tubing of the present invention is associated with the structure. Thus along each of the sides of foundation 11 a tubing 17 having longitudinally spaced branch tubes 19 and an exterior intake end 21 filled with a suitable removable cap 23 is extended along the upper surface of each of the sides of the foundation. The main portion of tubing 17 preferably lies substantially along the longitudinally midline of the side of the foundation with which it is associated, and intake end 21 forming part of tubing 17, is extended outwardly beyond the foundation for the purpose of providing access to the tubing after the completion of the building structure with which it is associated.

Branch tubings 19 are communicated with main tubing 17 and extend laterally therefrom preferably in pairs of arms as is shown in the drawings. These branch tubings in paired arms are disposed at longitudinally spaced intervals along the main tubing 17, and include downwardly extending discharge spouts 25 connected with the distal outer ends of the branch tubes. Discharge spouts 25 are respectively positioned to discharge downwardly along the inner and outer surfaces of the respective sides of the foundation 11 and tubing 17 is additionally provided with centrally disposed discharge spouts 26 directed downwardly toward the void in the blocks forming foundation 11. Spouts 26 preferably communicate with tubing 17 in lateral alinement with branches 19 and are substantially parallel to spouts 25. Thus it will be seen in the present drawings, as shown in FIG. 1, that four sets of tubing 17, branch tubes 19 and the related spouts are disposed along the respective four sides of the foundation 11. In the event that other offsets or shapes are provided in the foundation walls, other portions of similar tubing 17 should be provided therefor.

Discharge spouts 25, 26, of tubing 17, are downwardly open and are adapted to discharge the contents received within tubing 17 and from branches 19 downwardly into the underlying surfaces adjacent and along foundation 11.

Preferably additional supplemental tubing 27 is positioned prior to the introduction of the gravel fill or other features of the construction and is adapted for interaction with the piping, such as soil pipe 15. Tubing 27 includes an external intake opening 29 with a cap 31 similar to cap 23, and tubing 27 is preferably externally threaded as at 33 throughout a substantial portion of the length of the tubing. In order to receive the tubing 27, it is preferred that suitable openings be formed through foundation 11 in order that the tubing 27 may be extended through the foundation below the level of the top of the foundation, and so as not to interfere with the main tubing 17 heretofore referred to.

Preferably, a pair of lock nuts 35 are respectively engaged with threading 33 on the opposite faces of foundation 11 and securely lock supplemental tubing 27 into position with respect to foundation 11. At its inner end tubing 27 is provided with diverging branch arms 37 which communicate with tubing 27 and are adapted to receive discharge therefrom of the material received therein. Branch arms 37 diverge so as to embrace the opposite sides of piping, such as soil pipe 15, and are adapted to provide a means of effecting discharge into adjacency with the surface of a pipe 15 remote from the intake point of the material delivered therethrough. Each of the arms 37 terminates in a discharge portion 39 and may also be slotted or perforated, and the main portion of tubing 27 terminates in a discharge portion 41 which is substantially alined with tubing 27 and is adapted to discharge on the proximate side of pipe 15 for additionally furnishing the discharge of material in adjacency to the pipe 15.

Outwardly from the communication of branch arms 37 with tubing 27, the threading 33 on tubing 27 is engaged by an adjustment nut 43 which is coupled by a strapping 45 to pipe 15, strapping 45 extending from nut 43 to and around pipe 15 in order to couple the nut thereto, and as will be apparent, upon retraction of the nut 43 along threading 33 the strapping will be tautened, resulting in a firm connection between tubing 27 and pipe 15. It will be understood that similar tubing 27 may preferably be employed in conjunction with other downpiping mentioned hereinabove, and such as are conventionally utilized in conjunction with housing.

The addition of other elements of the building construction may thereafter be proceeded with. Thus the gravel forming fill 13 may be introduced into the interior area of foundation 11, effectively surrounding tubing 27 and its related portions interiorly of foundation 11, and also surrounding the innermost discharge spout 25 of branch tubes 19. When the gravel fill 13 has reached the level of the top of foundation 11, further filling is ordinarily discontinued.

It will thus be seen that tubing 17, together with branch tubes 19 and discharge spouts 25, 26, which are positioned to lie longitudinally along the portions of the foundation top, and which discharge spouts are downwardly open, are positioned to discharge into the voids formed in the interior of the foundation as by the central voids in the concrete blocks forming foundation 11, are further adapted to discharge externally adjacent to the external surface of foundation 11, and additionally are adapted to discharge adjacent the internal surface of foundation 11 into the gravel fill 13 which is filled in adjacency to the foundation. Access to each of the tubings 17 is provided through its intake end 21 by the simple removal of its cap 23 and the application thereto of a suitable pressure means such as a compression pump.

After the tubing system 17 and their related parts, together with the tubings 27 and their related parts, have been positioned and the gravel fill 13 completed, the construction of the building may then be proceeded with. In the type of construction which is here under consideration a concrete slab 47 may then be poured so as to overlie foundation 11, gravel fill 13 and the related tubing assemblies which have already been described.

It will be observed that discharge spouts 25, 26 of the tubings 17 are downwardly directed in adjacency to and within foundation 11, with a result that the possibility of blocking any of these discharge spouts during the pouring of the concrete slab 47 is substantially completely eliminated. Similarly, as the discharge portions of tubing 27 are laterally directed, and as the branch arms of the discharge portions are provided preferably with slots or perforations, the chance of blocking the discharge from these portions of the pouring of the concrete slab is also substantially completely eliminated. Insofar as the discharge portions of tubing 27 are concerned, these are further protected from blocking by the concrete material of slab 47 in virtue of the fact that these portions are covered by the gravel of fill 13. In addition in many constructions it is found desirable to cover the fill and foundation with a thin film 48 of a suitable plastic, effecting a waterproofing and superior covering of the understructure.

Preferably concrete slab 47 extends from wall to wall and side to side of foundation 11, overlying the foundation, and, therefore, covers in their entireties the tubing systems 17 which have been mounted in relationship with the upper extremity of foundation 11. With the pouring of the concrete slab and the mounting thereof upon the foundation and the gravel fill the tubing systems are completely locked tightly into position in conjunction with the building and are thereby permanently installed, with the tubings 17 being firmly embedded in the lowermost portion of the concrete slab 47 where the same comes into association with foundation 11.

Thus it will be seen that there is here embodied a system for the distribution of insecticides or termite or pest control materials which forms a permanent part of the building construction, which is firmly bonded into the construction in virtue of the mounting of the concrete slab thereupon, and which is provided with intake openings which are positioned to extend outwardly beyond the external extremities of foundation 11. Thus there is provided a system which is adapted for the reception of suitable termite or pest control material, which is accessible from the exterior of the building and yet which is mounted firmly, solidly and permanently within and as a part of the building structure with the desired discharge portions and discharge spouts positioned for strategic introduction of the control material into subsurface or lower portions of the building structure.

With the pouring and positioning of concrete slab 47, the under-structure of the building comprising foundation 11, gravel fill 13, concrete slab 47 and the tubing systems associated therewith is completed. Thereafter the internal partitions and walls of the building structure may be erected.

Figure 4:
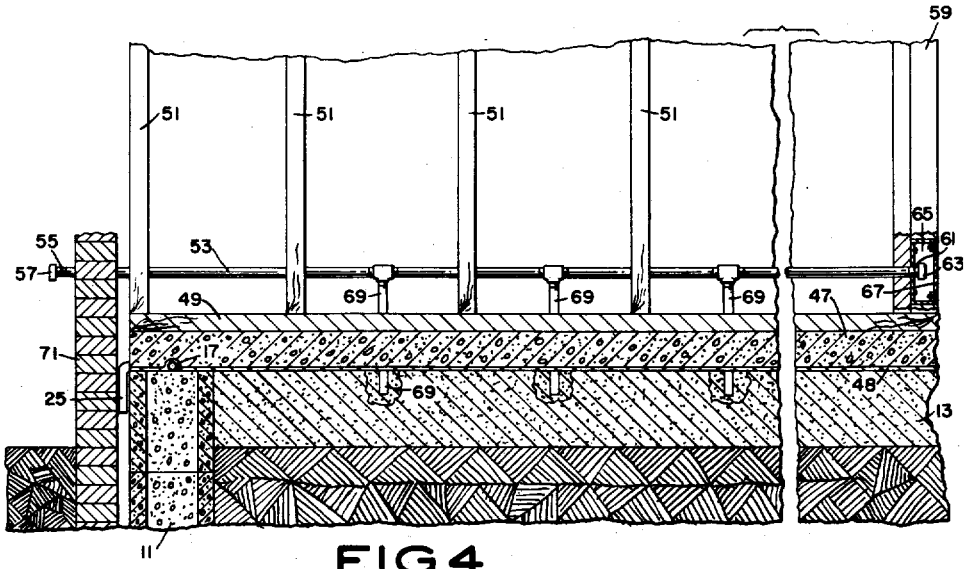
FIG. 4 is a longitudinal fragmentary sectional view illustrating an additional feature designed for use in conjunction with the present system.

In FIG. 4 a typical partition structure is illustrated comprising a plate 49 resting on and extending along the surface of the concrete slab 47 *and,* upon [which] plate 49, upright studs 51 are suitably mounted. Preferably, with the erection of partition framing as of the type just described, further tubing systems for the reception of termite and pest control material are to be installed. Thus as shown in FIG. 4, a longitudinal tubing 53, having an intake end 55 and a cap 57 similar to the caps previously described, is extended through suitable openings formed in studs 51 to the internal terminal of the partition which includes plate 49 and studs 51.

At its inner terminus, as for example at a door jamb 59, internal tubing 53 terminates in an additional intake end 61 suitably capped as by a cap 63, with the intake end 61 and cap 63 extending into a recess 65 provided in door jamb 59. Preferably a closure such as a cover 67 is provided in door jamb 59 so as to enclose the inner intake end 61 of tubing 53, and simultaneously to provide convenient access thereto. Such inner tubing as is described with respect to the tubing 53 is of particular value in connection with internal walls which do not have contact with the external walls of the building structure. Thus internal partitions may be provided with a means for tubing access for the reception of pest and termite control material and for the suitable discharge thereof into the building structure.

In order to accomplish such discharge it is preferred that tubing 53 be provided with downwardly extending discharge spouts 69 which extend downwardly through plate 49, slab 47, and into gravel fill 13. In some circumstances it is preferred that the discharge spouts 69 be preliminarily installed in the building structure prior to the introduction thereto of the concrete slab and of the plate 49 in order to minimize the difficulties of installation. In other circumstances it is found that suitable openings may be formed through plate 49 and through slab 47 after the installation thereof for the introduction thereinto of the discharge spouts 69.

As shown in FIG. 4, tubing 53 has an external intake opening which is suitably capped and extends outwardly beyond foundation 11 at a level above the level of the upper extremity of the foundation, and also includes the inner intake end 61 which has been described. In many circumstances, particularly with inner walls which do not contact the exterior walls as mentioned above, only the inner intake end 61 is to be provided on such upper level inner tubing 53. It will be apparent that access to the tubing 53 may be provided by removing recess cover 67 and cap 63 from intake end 61 with the thus provided ability to introduce termite and pest control material into tubing 53 for discharge downwardly along the interior walls into the subsurface supporting structures. Such inner tubing 53 is thus built into the original structure and is firmly locked in position by its interengagement with the partition comprising studs 51 and plate 49, together with door jamb 59.

After the completion of the erection of wall framing, external veneer such as the brick veneer 71 may then be applied. It will be observed that the brick veneer extends upwardly alongside foundation 11 and that the outermost of the downwardly extending discharge spouts 25 of the respective tubing systems 17 are positioned to project into the space or voids between the external veneer 71 and foundation 11, these voids being somewhat exaggerated in the present drawings for purposes of illustration. Intake ends of tubings 17, 27 and 53 are of a length to extend outwardly beyond the external surface of veneer 71 in order to provide for external access to the respective tubing systems from the exterior of the building structure.

It accordingly will be seen that the present invention provides for a completely built in and integrally locked system of tubing for the purpose of receiving termite and pest control material for discharge into suitable strategic areas of the underpinnings and undersurfaces of the building structure, that such tubing systems are permanently installed and built into this housing structure and include portions which are bonded into the gravel fill and concrete bonded by the concrete slab onto the main foundation of the structure. It will be appreciated that changes may be made in the details of the structure as herein defined without departing from the present invention.

I claim:

1. In a building which includes a foundation having inner and outer spaced apart surfaces and voids along its longitudinal center line intermediate said surfaces, a fill within said foundation, a concrete slab overlying said foundation beneath said concrete slab, said slab bonding on said concrete slab; termite and pest control means united with said building, comprising tubing means overlying, supported on and extending along the top of said foundation beneath said concrete slab, said slab bounding said tubing means in position on said foundation, said tubing means including a main tubing extending longitudinally along the top of said foundation, branch tubing extending laterally from said main tubing transversely across the top of said foundation at spaced intervals, downwardly open discharge spouts communicated respectively with said main tubing and said branch tubing, said discharge spouts projecting below said concrete slab closely adjacent the inner and outer surfaces and along the longitudinal center line of said foundation for discharge of pest and termite control fluid within and adjacent the inner and outer surfaces of said foundation, said tubing means respectively including intake means positioned outwardly beyond said foundation, additional tubing means extending through said foundation below the level of the top of said foundation into said fill, vertical pipe means extending through said slab and fill, adjustable means locking said additional tubing means to said pipe means, said additional tubing means including branch arms embracing said pipe means and having discharge means for fluid discharge adjacent to said pipe means, and further tubing means extending along and through said partition means including discharge spouts extending downwardly through said slab into said fill; said fill surrounding the last mentioned discharge spouts, said addtional tubing means and the innermost of the first mentioned discharge spouts, and said slab surrounding said main tubing along the top of said foundation.

2. In a building which includes a foundation having inner and outer spaced apart surfaces and voids along its longitudinal center line intermediate said surfaces, a fill within said foundation, a concrete slab overlying said foundation and said fill; termite and pest control means united with said building, comprising tubing means overlying, supported on and extending along the top of said foundation beneath said concrete slab, said slab bonding said tubing means in position on said foundation, said tubing means including a main tubing extending longitudinally along the top of said foundation, branch tubing extending laterally from said main tubing transversely across the top of said foundation at spaced intervals, downwardly open discharge spouts communicated respectively with said main tubing and said branch tubing, said discharge spouts projecting below said concrete slab closely adjacent the inner and outer surfaces and along the longitudinal center line of said foundation for discharge of pest and termite control fluid within and adjacent the inner and outer surfaces of said foundation, said tubing means respectively including intake means positioned outwardly beyond said foundation, additional tubing means extending through said foundation below the level of the top of said foundation into said fill, vertical pipe means extending through said slab and fill adjustable means locking said additional tubing means to said pipe means, said additional tubing means including branch arms embracing said pipe means and having discharge means for fluid discharge adjacent to said pipe means, said fill surrounding said additional tubing means and the innermost of the first mentioned discharge spouts, and said slab surrounding said main tubing along the top of said foundation.

3. In a building which includes a foundation having inner and outer spaced apart surfaces and voids along its longitudinal center line intermediate said surfaces, a fill within said foundation, a concrete slab overlying said foundation and said fill; termite and pest control means united with said building, comprising tubing means overlying, supported on and extending along the top of said foundation beneath said concrete slab, said slab bonding said tubing means in position on said foundation, said tubing means including a main tubing extending longitudinally along the top of said foundation, branch tubing extending laterally from said main tubing transversely across the top of said foundation at spaced intervals, downwardly open discharge spouts communicated respectively with said main tubing and said branch tubing, said discharge spouts projecting below said concrete slab closely adjacent the inner and outer surfaces and along the longitudinal center line of said foundation for discharge of pest and termite control fluid within and adjacent the inner and outer surfaces of said foundation, said tubing means respectively including intake means positioned outwardly beyond said foundation, said fill surrounding the innermost of the first mentioned discharge spouts, and said slab surrounding said main tubing along the top of said foundation.

4. In a building which includes a foundation having inner and outer spaced apart surfaces and voids along its longitudinal center line intermediate said surfaces, a fill within said foundation, a concrete slab overlying said foundation and said fill, and partition means mounted on said slab; termite and pest control means united with said building, comprising tubing means overlying, supported on and extending along the top of said foundation beneath said concrete slab, said slab bonding said tubing means in position on said foundation, said tubing means including a main tubing extending longitudinally along the top of said foundation, branch tubing extending laterally from said main tubing transversely across the top of said foundation at spaced intervals, downwardly open discharge spouts communicated respectively with said main tubing and said branch tubing, said discharge spouts projecting below said concrete slab closely adjacent the inner and outer surfaces and along the longitudinal center line of said foundation for discharge of pest and termite control fluid within and adjacent the inner and outer surfaces of said foundation, said tubing means respectively including intake means positioned outwardly beyond said foundation, and tubing means extending along and through said partition means including discharge spouts extending downwardly through said slab into said fill, said fill surrounding the last mentioned discharge spouts and the innermost of the first mentioned discharge spouts, and said slab surrounding said main tubing along the top of said foundation.

5. In a building which includes a foundation having inner and outer spaced apart surfaces and voids along its longitudinal center line intermediate said surfaces, a concrete slab overlying said foundation; termite and pest control means united with said building, comprising tubing means overlying, supported on and extending along the top of said foundation beneath said concrete slab, said slab bonding said tubing means in position on said foundation, said tubing means including a main tubing extending longitudinally along the top of said foundation, branch tubing extending laterally from said main tubing transversely across the top of said foundation at spaced intervals, downwardly open discharge spouts communicated respectively with said main tubing and said branch tubing, said discharge spouts projecting below said concrete slab adjacent the surfaces and along the longitudinal center line of said foundation for discharge of pest and termite control fluid within and adjacent the inner and outer surfaces of said foundation, said tubing means respectively including intake means positioned outwardly beyond said foundation, said slab surrounding said main tubing along the top of said foundation.

6. In a building which includes a foundation having inner and outer spaced apart surfaces and voids along its longitudinal center line intermediate said surfaces, support means overlying the top of said foundation; termite and pest control means united with said building, comprising tubing means overlying, supported on and extending along the top of said foundation beneath said support means, said support means fixing said tubing means in position on said foundation, said tubing means including a main tubing extending longitudinally along the top of said foundation, downwardly open discharge spouts communicated with said main tubing, said discharge spouts projecting below said support, means along the longitudinal center line of said foundation for discharge of pest and termite control fluid within the voids in said foundation, said tubing means respectively including intake means positioned outwardly beyond said foundation, said support means surrounding said main tubing along the top of said foundation.

*7. In a building which includes a peripheral foundation having inner and outer spaced apart surfaces and voids along its longitudinal center line intermediate said surfaces, support means overlying the top of said foundation; termite and pest control means united with said building, comprising tubing means supported by and extending along the top said foundation beneath said support means, said support means fixing said tubing means in a position on said foundation, said tubing means including a main tubing extending longitudinally along said foundation, said main tubing having downwardly open discharge openings communicated therewith, said main tubing positioned relative to the longitudinal center line of said foundation so that said discharge openings are directed downwardly along the longitudinal center line of said foundation for discharge of pest and termite control fluids within the voids in said peripheral foundation, said tubing means respectively including intake means extending beyond said foundation, said support means surrounding said main tubing adjacent the top of said foundation.*

*8. In a building which includes a peripheral foundation having inner and outer spaced apart surfaces and voids along its longitudinal center line intermediate said surfaces, support means overlying the top of said foundation; termite and pest control means united with said building, comprising tubing means supported by and extending along the top of said foundation beneath said support means, said support means fixing said tubing means in position on said foundation, said tubing means including a main tubing extending longitudinally along said foundation, said main tubing having discharge openings communicated with said main tubing adjacent the inner and outer surfaces of said foundation and additional discharge openings directed downwardly along the longitudinal center line of said foundation, said main tubing being positioned relative to the center line of said foundation for discharge of pest and termite control fluid within the voids along the center line of said peripheral foundation and adjacent to the surfaces of said foundation, said tubing means respectively including intake means positioned outwardly beyond said foundation, said support means surrounding said main tubing adjacent the top of said foundation.*

*9. In a building which includes a peripheral foundation having inner and outer spaced apart surfaces and voids along its longitudinal center line intermediate said surfaces, support means overlying the top of said foundation; termite and pest control means united with said*

*building, comprising tubing means extending along the top of said foundation beneath said support means, said support means fixing said tubing means in position to said foundation, said tubing means including a main tubing extending longitudinally along said foundation, said main tubing having discharge openings communicated therewith, said main tubing being positioned relative to said foundation center line with said openings directed downwardly along the longitudinal center line of said foundation for discharge of pest and termite control fluid within the voids along the center line of said peripheral foun-*

*dation, additional discharge means communicated with said main tubing and discharging adjacent the inner and outer surfaces of said foundation, said tubing means respectively including intake means positioned outwardly beyond said foundation, said support means surrounding said main tubing adjacent the top of said foundation.*

References Cited in the file of this patent
or the original patent

UNITED STATES PATENTS 2,842,892 Aldridge et al. ---------- July 15, 1958